US007425361B2

(12) United States Patent

Ishii

(10) Patent No.: US 7,425,361 B2
(45) Date of Patent: Sep. 16, 2008

(54) SPEAKER GRILLE, INJECTION MOLDING MOLD, AND BROADCAST DATA RECEIVING DEVICE HAVING SUCH SPEAKER GRILLE

(75) Inventor: Hiroki Ishii, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 502 days.

(21) Appl. No.: 11/167,075

(22) Filed: Jun. 27, 2005

(65) Prior Publication Data

US 2006/0286344 A1 Dec. 21, 2006

(30) Foreign Application Priority Data

Jun. 25, 2004 (JP) ............................ 2004-003735

(51) Int. Cl.
*B32B 3/24* (2006.01)
*A47B 81/06* (2006.01)

(52) U.S. Cl. ...................... 428/137; 428/131; 181/150; 181/199

(58) Field of Classification Search ................. 428/131, 428/137; 180/150, 199
See application file for complete search history.

(56) References Cited

U.S. PATENT DOCUMENTS

| | | | | | |
|---|---|---|---|---|---|
| 4,832,150 | A | * | 5/1989 | Just et al. | 181/175 |
| 4,919,227 | A | * | 4/1990 | Chicoine | 181/175 |
| 5,419,865 | A | * | 5/1995 | Ogata et al. | 264/328.1 |
| 5,526,064 | A | * | 6/1996 | Okugawa et al. | 348/818 |
| 5,623,133 | A | * | 4/1997 | Kurihara | 181/175 |
| 5,825,903 | A | * | 10/1998 | Shiota et al. | 381/391 |
| 5,868,475 | A | * | 2/1999 | Shikata et al. | 312/7.2 |
| 6,720,069 | B1 | * | 4/2004 | Murakami et al. | 428/319.3 |

FOREIGN PATENT DOCUMENTS

| | | | |
|---|---|---|---|
| JP | 05-050467 | A | 3/1993 |
| JP | 07-117083 | A | 5/1995 |
| JP | 2887832 | B | 2/1999 |

* cited by examiner

*Primary Examiner*—William P Watkins, III
(74) *Attorney, Agent, or Firm*—Global IP Counselors, LLP

(57) ABSTRACT

A speaker grille has a grille base, a plurality of front through holes formed on a front side of the grille base, and a plurality of back through holes formed on a back side of the grille base, each of the plurality of front through holes communicating with one of the plurality of back through holes at its inner end. The front through holes are smaller than the back through holes at the inner ends. Such speaker grille is formed by injection-molding a resin using a mold having a stationary half provided with a plurality of stationary side mold pins, and a movable half provided with a plurality of movable side mold pins. The stationary half is designed to form a front side of the speaker grille. The stationary mold pins have distal end faces that are smaller than distal ends faces of the movable mold pins.

7 Claims, 6 Drawing Sheets

SPEAKER GRILLE, INJECTION MOLDING MOLD, AND BROADCAST DATA RECEIVING DEVICE HAVING SUCH SPEAKER GRILLE

BACKGROUND OF THE INVENTION

1. Field of the Invention

The present device relates to a speaker grille that is resin-molded from a synthetic resin and has a plurality of through holes, an injection molding mold, and to a broadcast data receiving device having such speaker grille.

2. Background Information

Generally, a speaker grille that covers the front of a speaker (such as an audio speaker) is provided with many through holes. When such speaker grilles is resin-molded by injection molding, distal end faces of mold pins on the stationary half of the mold are pressed at a specific pressure against the molding surface of the movable half. Then, the distal end faces of the mold pins are separated from the molding surface of the stationary half when the molded speaker grille is to be removed. If the through holes in the speaker grille are small in size, the length of the mold pins is greater than their diameter. Therefore, the mold pins tend to be misaligned or become deformed when the resin is cast into the mold, or when the molded speaker grille is taken out. Such misalignment and deformation result in aesthetic defects such as burrs in the through holes or in the surrounding areas. Another drawback is that repair of deformation of the mold pins drives up the cost. A number of inventions have been proposed to deal with this situation.

Japanese Patent Application Publication No. H5-50467 (paragraphs 0005 to 0021, FIG. 3) discusses a method for preventing burrs from being generated in the through holes and the surrounding areas, in the case of the injection molding a synthetic resin product that has an approximate V-shape in cross section with a roof portion and a side wall portion connected thereto, where a plurality of through holes are provided to the side wall portion that is at an angle relative to the roof portion. Since the side wall is at an angle relative to the roof portion, a gap is produced between the distal end force-cutting faces of the mold pins used to form the through holes and the movable half, and burrs tend to generated in this gap. According to the method disclosed in this document, the portion of the movable half that is pressed against the distal end faces of the mold pins and forms the areas around the openings of the through holes is formed in a stepped shape so as to be perpendicular to the through holes. In this manner, the gap between the distal end faces of the mold pins and the movable half against which these distal end faces are pressed is eliminated. Thus, no burrs are generated.

Japanese Patent Application Publication No. H7-117083 (paragraphs 0013 to 0035, FIGS. 4 and 6) discusses a method of preventing the occurrence of burrs or clogging in the through holes in the resin-molding of filters that have numerous through holes. According to this document, a plurality of protrusions corresponding to the through holes in the molded filter is provided to the movable half of the mold. Gas release holes and insertion holes are provided to the stationary half of the mold, so that the protrusions can be inserted into the insertion holes without any gap around the outer peripheral surface of the protrusions. After these protrusions are inserted into the insertion holes, the mold is clamped keeping the stationary and the movable halves of the mold apart by the thickness of the filter, and resin is injected into this gap. In this manner, occurrences of burrs and clogging in the through holes are prevented.

Japanese Patent No. 2,887,832 (paragraphs 0010 to 0030, FIGS. 1 and 2) discloses a method of preventing aesthetic defects such as flow marks and welds in the molding of a speaker grille that is designed cover the surface of a speaker. In the method of molding a speaker grille discussed in this document, a grille plate having a plurality of through holes and a frame provided around this plate are integrally resin-molded, and a ring-shaped groove is provided around the inner periphery of the frame between the frame and the grille plate. This structure allows the inside of the mold to be better filled with resin during the molding, and prevents generation of aesthetic defects such as flow marks and welds. The strength of the grille plate is also increased by integrally molding lattice-shaped reinforcing ribs on the back side of the speaker grille.

In Japanese Patent Application Publication No. H5-50467, the gap is eliminated between the distal end faces of the mold pins and the movable half, which helps to prevent generation of burrs. However, because the mold pins are shaped longer than their diameters, in other words the mold pins have a slender shape, there is no improvement in terms of the strength of the mold pins. Accordingly, misalignment or deformation of the mold pins is still likely to occur when the resin flows in.

In Japanese Patent Application Publication No. H7-117083, a plurality of protrusions corresponding to through holes to be formed in a molded article are provided to the movable half of the mold, and gas release holes and insertion holes are provided to the stationary half so that the protrusions could be inserted into the insertion holes without any gap between the protrusions and the insertion holes. Although this structure does prevent the clogging of the through holes, because the protrusions are shaped longer than their diameter in the case a filter having a small aperture size is molded, the strength of the protrusions cannot be sufficiently maintained. Accordingly, there is still a possibility that misalignment or deformation occurs when the resin flows in.

Although the technology of Japanese Patent No. 2,887,832 does prevent aesthetic defects such as flow marks and welds, the problem of aesthetic defects is not solved. When the through holes are formed so as to overlap with the reinforcing ribs that are formed in a lattice pattern on the back side of the speaker grille, the through holes appear to be clogged because the reinforcing ribs are visible through the through holes when viewed from the front of the speaker grille.

In addition to the methods discussed in the above documents, there is a method in which, rather than disposing the mold pins on just the stationary half of the mold, mold pins of the same shape are disposed on both the stationary half and the movable half as shown in FIG. 4. With this method, the strength of the mold pins is improved because the mold pins need to be only half as long as mold pins that are formed only on one of the movable and the stationary halves. However, if the mold pins provided on both sides are misaligned, or if the resin flows in between the joint faces of the mold pins because of inadequate pressure on the mold pins, burrs occur in the through holes and the surrounding areas as shown in FIGS. 4(*c*)-(*d*), and aesthetic defects result.

In view of the above, it will be apparent to those skilled in the art from this disclosure that there exists a need for an improved speaker grille, injection molding mold, and broadcast data receiving device having such speaker grille that overcome the problems of the conventional art. This invention addresses this need in the art as well as other needs, which will become apparent to those skilled in the art from this disclosure.

SUMMARY OF THE INVENTION

It is an object of the present invention to reduce the occurrence of burrs in the through holes and surrounding areas of a speaker grille that has a plurality of through holes and is formed by injection-molding.

The speaker grille according to the first aspect of the present invention is a speaker grille that is formed by resin-mold injection and has a grille base, the grille base having a plurality of front through holes formed on a front side of the grille base, and a plurality of back through holes formed on a back side of the grille base. Each of the plurality of front through holes communicates with one of the plurality of back through holes at its inner end. The front through holes are smaller than the back through holes at the inner ends.

An injecting molding mold in accordance with the sixth aspect of the present invention is for molding a speaker grille having a plurality of through holes. The injecting molding mold includes a stationary side member provided with a plurality of stationary side mold pins, and a movable side member provided with a plurality of movable side mold pins. The plurality of stationary side mold pins and the plurality of movable side mold pins are designed to press against one another when the stationary and movable side members are clamped together. One of the stationary side and movable side members is designed to form a front side of the speaker grille. The one of the stationary side and movable side members designed to form the front side of the speaker grille has mold pins whose distal end faces are smaller than distal ends faces of mold pins of the other of the stationary side and movable side member.

When a speaker grille having a plurality of through holes is formed by providing mold pins only to the stationary side member, the mold pins are much longer than their diameter. Therefore, the shape of the mold pins is slender, making it difficult to maintain high strength. Consequently, the mold pins tend to be deformed or misaligned when the resin flows into the mold, and a gap tends to be produced at portions where the distal end faces of the mold pins and the movable side member of the mold are pressed against one another. This results in inconsistent shape of the through holes, burrs being formed in the through holes, and other such problems.

With the speaker grille of this embodiment, by providing the mold pins to both the stationary side member and the movable side member, the length of the mold pins can be reduced, and therefore their strength can be improved. Accordingly, these problems can be reduced.

Furthermore, when mold pins of the same shape are provided to both the stationary side member and the movable side member, if the mold pins of both side members become misaligned, there tends to be misalignment at the portions where the distal end faces are pressed against one another inside the through holes. These misaligned portions make it look as though the through holes are partially clogged. Therefore, when the speaker grille is viewed from the front, this misalignment creates the appearance of a burr, and adversely affects the appearance.

With the speaker grille of this aspect of the invention, however, the distal end faces of the mold pins of the front side member are smaller than the distal end faces of the mold pins of the back side member. Accordingly, the front through holes are smaller than the back through holes at the inner end, and therefore a stepped portion is created at the inner end, where the distal end faces of the front mold pins and the back mold pins are pressed against one another in the through holes. Since the front though holes are smaller than the back through holes, when the speaker grille is viewed from the front, the stepped portion does not create the appearance of the through holes being partially clogged, and therefore the appearance of a burr is not created. Therefore, the above problems with aesthetic defects can be reduced.

The speaker grille in accordance with the second aspect of the present invention is the speaker grille according to the first aspect, wherein a length of the front through hole between the inner end and a front side end is substantially the same as a length of the corresponding back through hole between the inner end and a back side end.

The injection molding mold in accordance with the seventh aspect of the present invention is the injection molding mold according to the sixth aspect, wherein a length of the stationary mold pins is substantially the same as a length of the movable mold pins.

With the speaker grille of this aspect of the invention, the length of the front through holes is substantially the same as the length of the back through holes. As a result, the through holes are formed with the same pressure being applied to the mold pins of both front and back side members. This makes deformation of the mold pins of both side members even less likely to happen. Thus, it is easier to ensure that no gap is formed between the distal end faces of the mold pins, and misalignment of the mold pins is less likely to occur when the mold pins of both front and back side members are pressed against one another. In other words, the occurrences of burrs at the inner end where the mold pins are pressed against one another can be reduced. Therefore, it is possible to mold a speaker grille with less aesthetic defects.

The speaker grille in accordance with the third aspect of the present invention is the speaker grille according to the first or second aspect, wherein the front through holes are circular in shape at their inner ends, and the back through holes are rectangular in shape at their inner ends.

The injection molding mold in accordance with the eighth aspect of the present invention is the injection molding mold according to the sixth aspect, wherein one of the plurality of stationary mold pins and the plurality of movable mold pins has distal end faces that are substantially circular in shape, while the other of the plurality of stationary mold pins and the plurality of movable mold pins has distal end faces that are substantially rectangular in shape.

With this speaker grille, through holes that are substantially rectangular in shape are formed in a lattice pattern on the back side of the speaker grille, which increases the strength of the speaker grille. Also, when the speaker grille is viewed from the back, substantially circular holes appear to be enclosed within substantially rectangular holes. In other words, when viewed from the front of the speaker grille, only the substantially circular through holes can be seen. Therefore, even if there is a certain amount of misalignment when the mold pins are pressed together, this misalignment does not result in the appearance of burrs, so the problem of aesthetic defects can be reduced.

The speaker grille in accordance with the fourth aspect of the present invention is the speaker grille according to the third aspect, wherein each of the front through holes tapers from a front side end toward the inner end.

The injection molding mold in accordance with the ninth aspect of the present invention is the injection molding mold according to the eighth aspect, wherein the plurality of mold pins with substantially circular distal end faces tapers toward the distal end faces.

With the speaker grille of this aspect of the invention, the front through holes are formed so that they taper from the proximal end portion toward the distal end face. By forming the mold pins in this shape, the strength of the mold pins can be increased as compared to cylindrical mold pins having the same surface as the end face at all portions. As a result, deformation of the mold pins at the time the resin is injected into the mold is even less likely to occur. Accordingly, burrs are less likely to be produced at the inner end, where the distal end faces are pressed against one another, and the problem of aesthetic defects can be reduced.

The injection molding mold in accordance with the tenth aspect of the present invention is the injection molding mold according to any of the sixth through ninth aspects, wherein the distal end faces of the stationary mold pins are smaller than the distal end faces of the movable mold pins.

The injection molding mold in accordance with the eleventh aspect of the present invention is the injection molding mold according to the eighth or ninth aspect, wherein the stationary mold pins have distal end faces that are substantially circular in shape, while the movable mold pins have distal end faces that are substantially rectangular in shape.

A broadcast data receiving device in accordance with the fifth aspect of the present invention includes a cabinet having a display and the speaker grille according to one of the first through fourth aspects of the present invention, and a broadcast data receiver configured to receive data and display the data at the display.

With this broadcast receiving device, because the speaker grille according to any of the first through fourth aspects is provided, the broadcast data receiving device can be equipped with a speaker grille with less aesthetic defects that are caused by burrs in the through holes.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
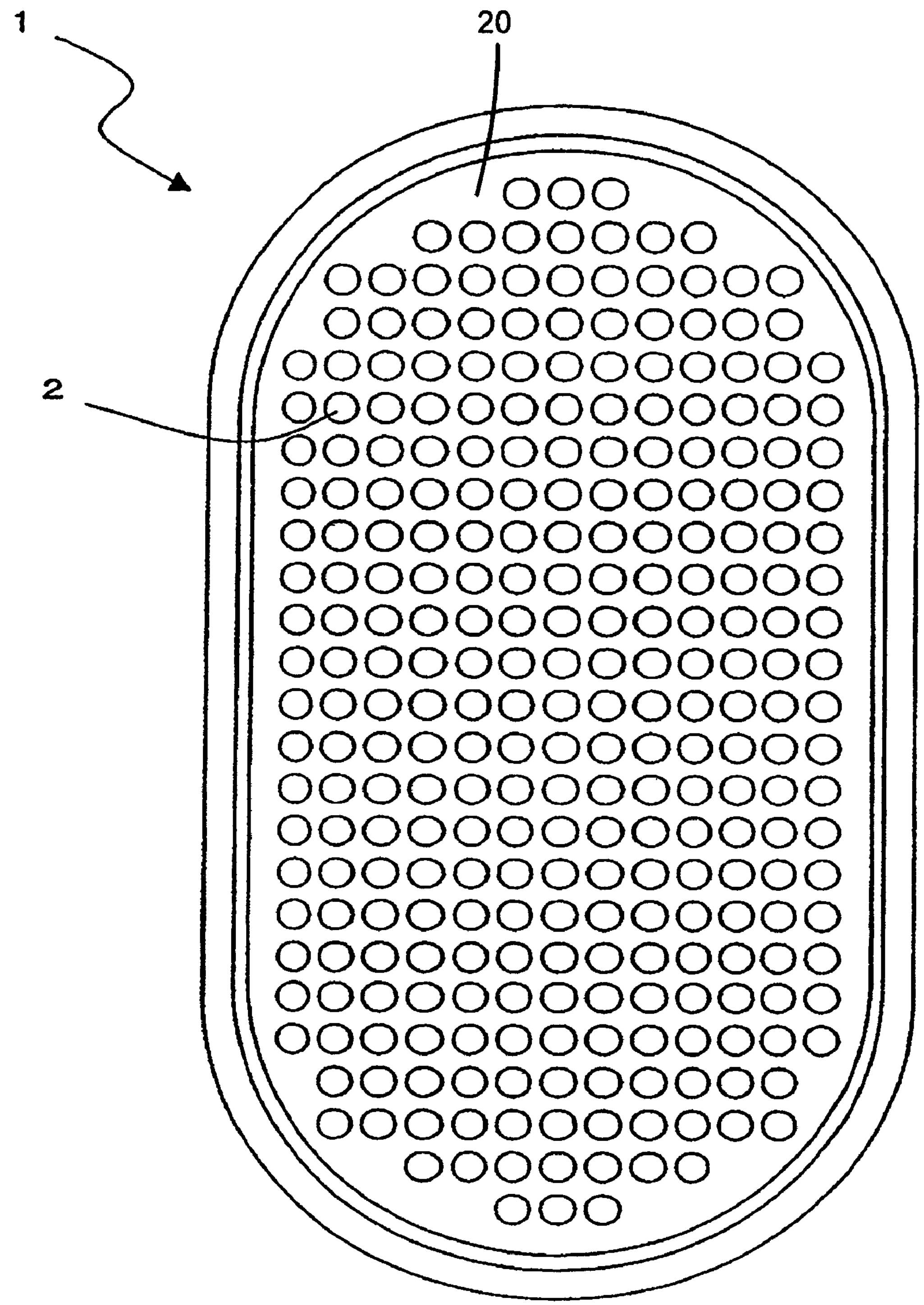
FIG. 1 is a simplified diagram of the front side of the speaker grille in accordance with this embodiment.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Injection Molding Mold for a Speaker Grille

The speaker grille 1 in accordance with this embodiment is formed by resin-molding in a speaker grille injection molding mold 10. The speaker grille injection molding mold 10 includes a movable half 11 and a stationary half 13.

FIG. 5*a* is a cross sectional view of the injection molding mold 10 used for the resin-molding of the speaker grille 1. The injection molding mold 10 is equipped with the movable half 11 and the stationary half 13. The movable half 11 is equipped with a plurality of mold pins 12. The stationary half 13 is equipped with a plurality of mold pins 14. The mold pins 12 are quadrangular columns having distal end faces that are substantially rectangular in shape, while the mold pins 14 are formed so that they taper from the proximal end portion toward the distal end face, and the distal end faces are substantially circular in shape. The distal end faces of the mold pins 14 are smaller than the distal end faces of the mold pins 12.

Figure 5:
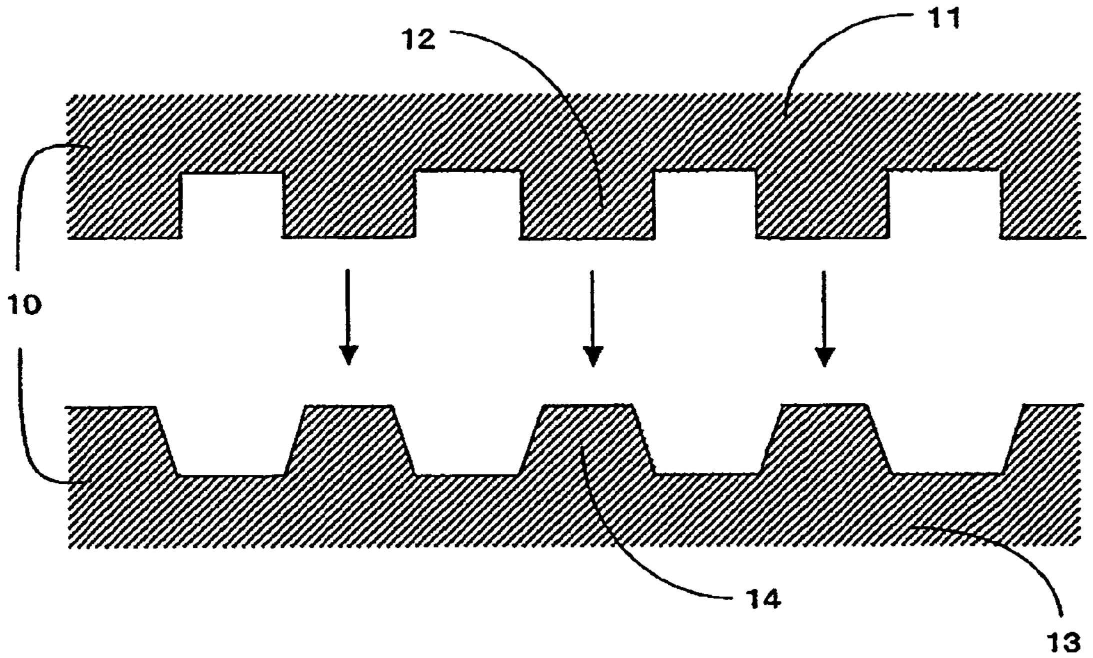
FIGS. 5(*a*)-(*b*) are cross sectional views of the injection molding mold in accordance with an embodiment of the present invention, before and after the clamping.
Figure 5:
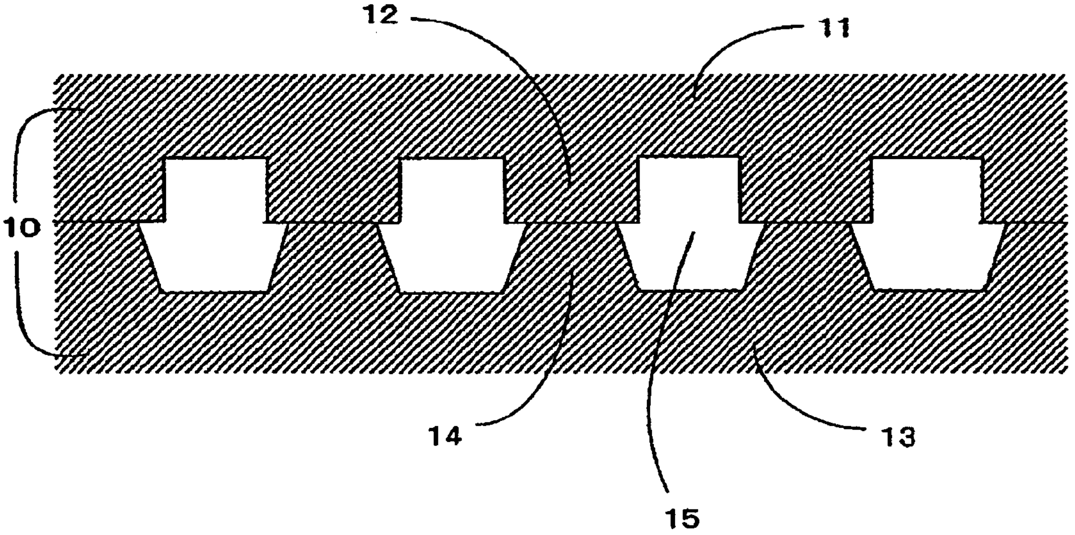

The process of resin-molding the speaker grille 1 is carried out with the injection molding mold 10, by clamping the movable and stationary halves 11 and 13 at the position where the distal end faces of the mold pins 12 and the distal end faces of the mold pins 14 are pressed against one another, so as to create a resin injection component 15 as shown in FIG. 5(*b*). Then, a molten resin is injected into the resin injection component 15 inside the mold 10. After cooling and solidifying the resin, the resin speaker grille 1 is removed from the injection molding mold 10.

Speaker Grille

Figure 2:
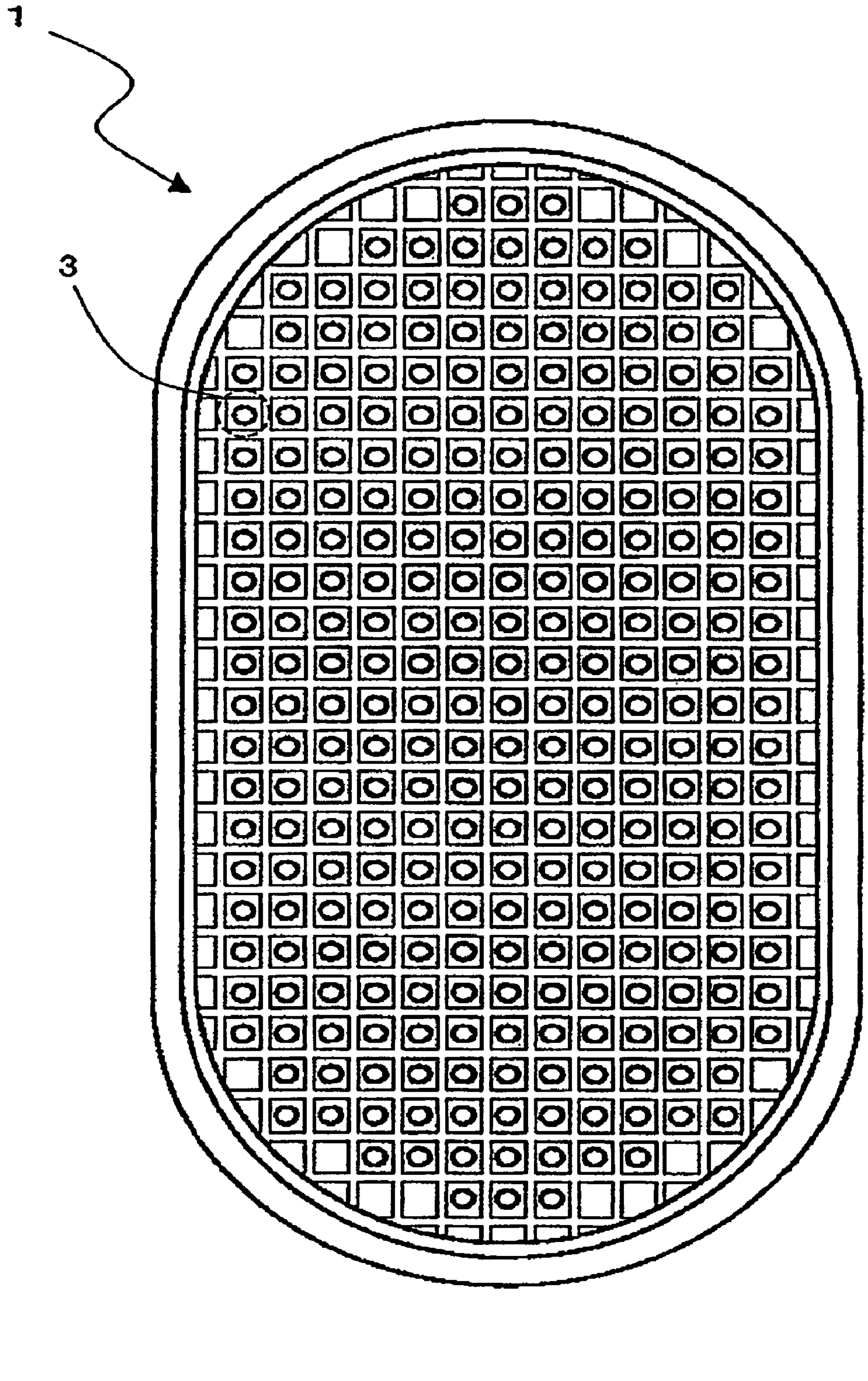
FIG. 2 is a simplified diagram of the back side of the speaker grille in accordance with this embodiment.

FIG. 1 is a simplified diagram of the front side of the speaker grille 1 in accordance with this embodiment, which is produced by a resin-molding process using the injection molding mold 10. The speaker grille 1 has a grille base 20, with a plurality of front through holes 2 being formed on the front side of the grille base 20, and a plurality of back through holes 3 being formed on the back side of the grille base 20. FIG. 2 is a simplified diagram of the back side of the same speaker grille 1, in which a plurality of through holes 3 that communicate with the through holes 2 are formed.

Figure 3:
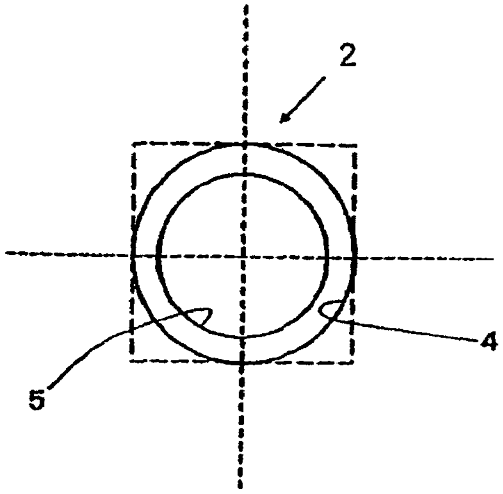
FIGS. 3(*a*)-(*c*) are respectively a detailed view of a through hole on the front side of the speaker grille in accordance with this embodiment, a cross sectional view of the speaker grille in accordance with this embodiment, and a detailed view of through holes on the back side of the speaker grille in accordance with this embodiment.
Figure 3:
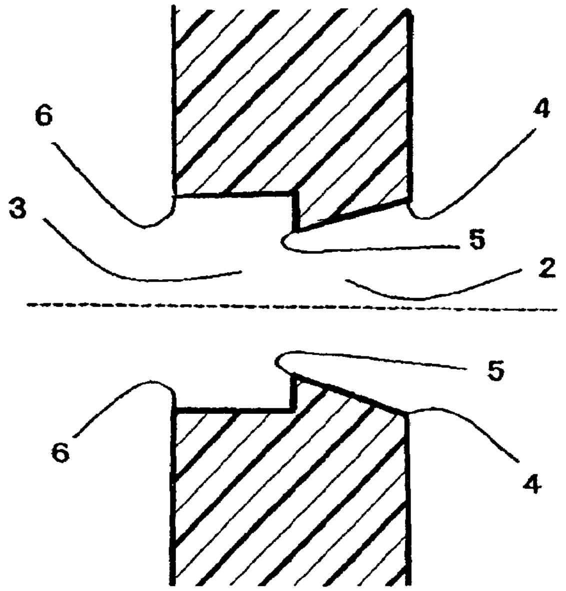
Figure 3:
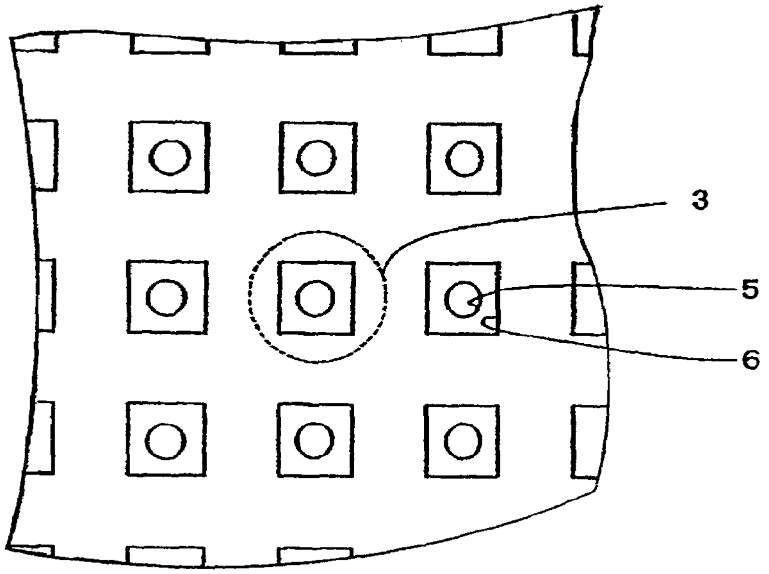

FIG. 3(*a*) is a view of the details of a through hole 2 formed on the front side of the speaker grille 1, while FIG. 3(*c*) is a view the details of the through holes 3 formed on the back side of the speaker grille 1. FIG. 3(*b*) is a cross sectional view of the through holes 2 and 3 of the speaker grille 1.

The through holes formed in the speaker grille 1 are substantially circular on the front side of the speaker grille 1 and substantially rectangular on the back side at the inner ends 5 where the distal end faces of the mold pins 12 and the mold pins 14 are pressed against one another, with the substantially circular front through holes 2 being smaller than the substantially rectangular back through holes 3. Therefore, as shown in FIG. 3(*c*), when the speaker grille 1 is viewed from the back side, the circular holes appear to be surrounded by the rectangular holes. Furthermore, as shown in FIG. 3(*a*), when the speaker grille 1 is viewed from the front side, the rectangular holes cannot be seen. The distance between the inner end 5 of the rectangular through hole 3, where the distal end faces of the mold pins 12 and the mold pins 14 are pressed against one another, and the opening 6 of the rectangular through hole 3 on the back side of the speaker grille 1 is substantially the same as the distance between the inner end 5 and the opening 4 of the circular through hole 2 on the front side of the speaker grille 1. Also, the size of the circular through holes increases from the inner ends 5, where the distal end faces of the mold pins 12 and the mold pins 14 are pressed against one another, toward the openings 4 in the speaker grille 1. In other words, the front through holes 2 taper toward its inner ends 5 from the front side openings 4.

Figure 6:
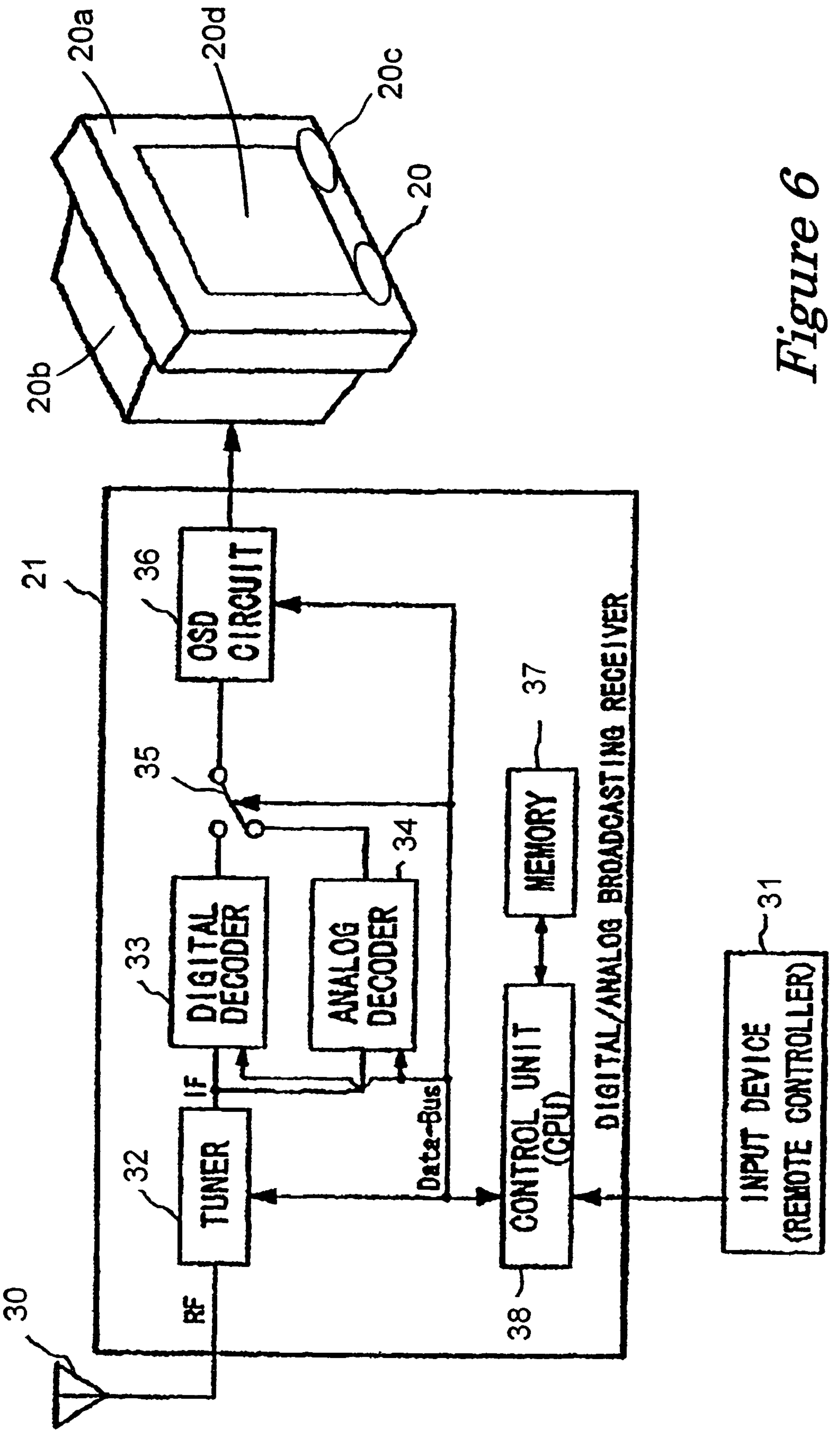
FIG. 6 is a television receiver having speaker grilles in accordance with the embodiment of the present invention.

FIG. 6 shows a television receiver 20, which is an example of the broadcast data receiving device. The television receiver 20 includes a front cabinet 20*a*, a rear cabinet 20*b*, speaker grilles 20*c* formed on the front cabinet 20*a*, a display 20*d* provided on the front cabinet 20*a*, and a digital/analog broadcasting receiver 21 accommodated within the front and the rear cabinets 20*a*, 20*b*. The digital/analog broadcasting receiver 21 includes a tuner 32 for receiving digital/analog broadcasting signals through an antenna 30, a digital decoder 33 and an analog decoder 34 for decoding digital/analog signals received by the tuner 32, a switch 35 for switching the broadcasting signal decoded by the digital decoder 33 or the analog decoder 34, and an OSD (on-screen display) circuit 36 for creating data to be displayed at the display 20*d*. The speaker grilles 20*c* are the speaker grille 1 in accordance with the present invention, and are manufactured using the injection molding mold 10 of the present invention.

When a speaker grille having a plurality of through holes is formed by providing mold pins only to the stationary half, the mold pins are much longer than their diameter. Therefore, the shape of the mold pins is slender, making it difficult to maintain high strength. Consequently, the mold pins tend to be deformed or misaligned when the resin flows into the mold, and a gap tends to be produced at portions where the distal end faces of the mold pins and the movable half of the mold are pressed against one another. This results in inconsistent shape of the through holes, burrs being formed in the through holes, and other such problems.

With the speaker grille 1 of this embodiment, by providing the mold pins 12 and the mold pins 14 to both the stationary half 13 and the movable half 11, the length of the mold pins can be reduced, and therefore their strength can be improved. Accordingly, these problems can be reduced.

Figure 4:
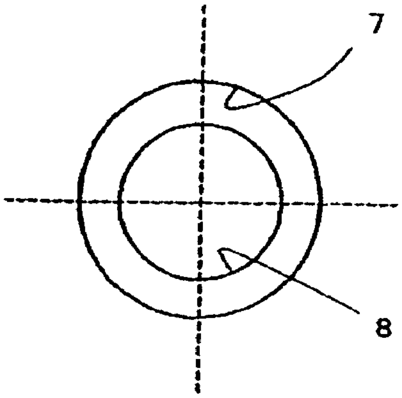
FIGS. 4(*a*) and 4(*c*) are detailed views of a through hole on the front side of a conventional speaker grille, and FIGS. 4(*b*) and 4(*d*) are cross sectional views of the conventional speaker grille.
Figure 4:
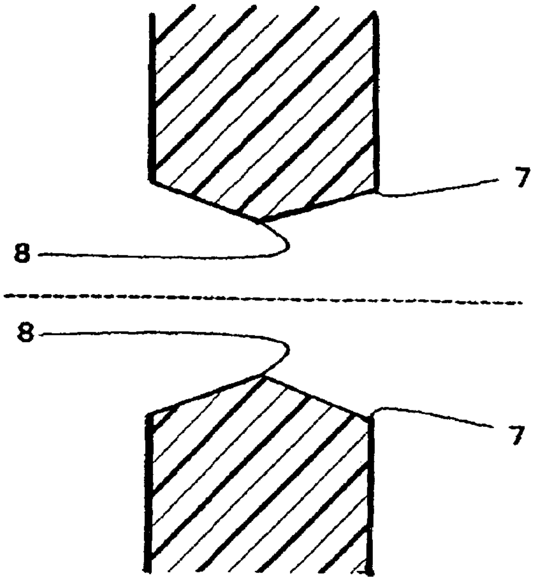
Figure 4 (b) PRIOR ART
Figure 4:
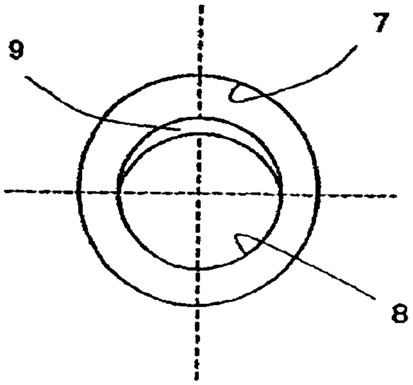
Figure 4:
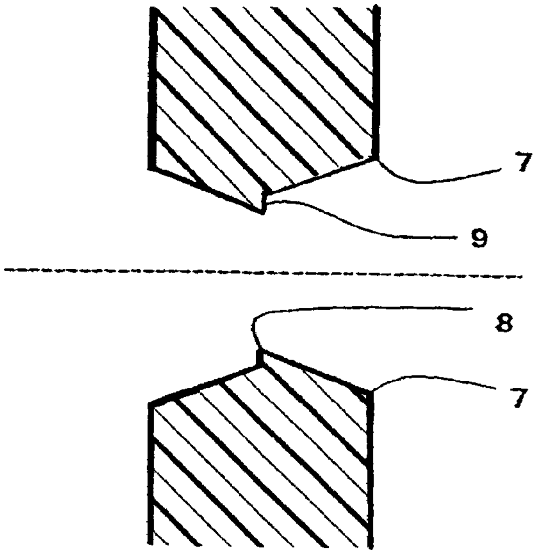
Figure 4 (d) PRIOR ART

Furthermore, if mold pins of the same shape are provided to both the stationary half and the movable half as shown in FIGS. 4(*a*) and 4(*b*), when the mold pins of both halves become misaligned as shown in FIGS. 4(*c*) and 4(*d*), there tends to be misalignment at the portions 8 where the distal end faces are pressed against one another inside the through holes. These misaligned portions make it look as if the through holes are partially clogged. Therefore, when the speaker grille is viewed from the front, this misalignment creates the appearance of a burr 9, and adversely affects the appearance.

With the speaker grille 1 of this embodiment, however, the circular distal end faces of the mold pins 14 are smaller than the rectangular distal end faces of the mold pins 12. Accordingly, the front through hole 2 is smaller than the back through hole 3 at the inner end 5, and therefore a stepped portion is created at the inner end 5, where the distal end faces of the mold pins 12 and the mold pins 14 are pressed against one another. Since the front through holes 2 are smaller than the back through holes 3, when the speaker grille 1 is viewed from the front, the stepped portion does not create the appearance the through holes being partially clogged, and therefore the appearance of a burr is not created. Therefore, the above described problems with aesthetic defects can be reduced.

Furthermore, with the speaker grille 1 of this embodiment, the length of the mold pins 12 is the same as the length of the mold pins 14. As a result, the through holes are formed with the same pressure being applied to the mold pins of both halves. This makes deformation of the mold pins of both halves even less likely to happen. Thus, it is easier to ensure that no gap is formed between the distal end faces of the mold pins, and misalignment of the mold pins is less likely to occur when the mold pins of both halves are pressed against one another. In other words, the occurrence of burrs at the inner end 5 where the mold pins are pressed against one another can be reduced. Therefore, it is possible to mold a speaker grille with less aesthetic defects.

Also, with the speaker grille 1 of this embodiment, the mold pins 14 are formed so that they taper from the proximal end portion toward the distal end face. By forming the mold pins 14 in this shape, the strength of the mold pins 14 can be increased as compared to cylindrical mold pins having the same surface as the end face at all portions. As a result, deformation of the mold pins 14 at the time the resin is injected into the mold is even less likely to occur. Accordingly, burrs are less likely to be created at the inner end 5, where the distal end faces are pressed against one another, and the problem of aesthetic defects can be reduced.

Still furthermore, with the speaker grille of this embodiment, through holes that are substantially rectangular in shape are formed in a lattice pattern on the back side of the speaker grille, which increases the strength of the speaker grille.

Also, with the speaker grille of this embodiment, when the speaker grille is viewed from the back, the substantially circular shapes formed at the inner ends 5 appear to be enclosed within the substantially rectangular shapes. When viewed from the front, however, only the substantially circular through holes can be seen. Therefore, even if there is a certain amount of misalignment between the halves 11 and 13 when the mold pins 12 and 14 are pressed against one another, this misalignment does not result in the appearance of burrs. Accordingly, the problem of aesthetic defects can be reduced.

Although the rear through holes 3 are rectangular in shape in the above-described embodiment, the rear through holes may have a circular shape with a greater diameter than that of the circular shape of the front through hole 2 at the inner end 5.

The present invention reduces the occurrences of burrs in the through holes of a speaker grille, and reduces aesthetic defects on the front side of the speaker grille.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Utility Model Application No. 2004-003735. The entire disclosure of Japanese Utility Model Application No. 2004-003735 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A speaker grille formed by resin mold-injection and configured to cover a speaker, comprising:

a grille base, the grille base having a plurality of front through holes formed on a front side of the grille base, and a plurality of back through holes formed on a back side of the grille base, each of the plurality of front through holes communicating with one of the plurality of back through holes at its inner end, the back side of the grille base being configured to face the speaker, the front through holes being smaller than the back through holes at the inner ends and tapering from a front side end toward the inner end.

2. The speaker grille according to claim 1, wherein a length of the front through hole between the inner end and a front side end is substantially the same as a length of the corresponding back through hole between the inner end and a back side end.

3. The speaker grille according to claim 1, wherein the front through holes are circular in shape at their inner ends, and the back through holes are rectangular in shape at their inner ends.

4. A broadcast data receiving device, comprising a cabinet having a display and the speaker grille according to claim 1; and a broadcast data receiver configured to receive data and display the data at the display.

5. A speaker grille formed by resin mold-injection and configured to cover a speaker, comprising:

a grille base, the grille base having a plurality of front through holes formed on a front side of the grille base, and a plurality of back through holes formed on a back side of the grille base, each of the plurality of front through holes communicating with one of the plurality of back through holes at its inner end, the back side of the grille base being configured to face the speaker, the front through holes being smaller than the back through holes at the inner ends, a length of the front through hole between the inner end and a front side end being substantially the same as a length of the corresponding back through hole between the inner end and a back side end, the front through holes being circular in shape at their inner ends, back through holes being rectangular in shape at their inner ends, and each of the front through holes tapering from the front side end toward the inner end.

6. The speaker grille according to claim 1, wherein each of the front through holes communicates in a one-to-one relationship with each of the back through holes at the inner end.

7. The speaker grille according to claim 3, wherein each of the front through holes communicates in a one-to-one relationship with each of the back through holes at the inner end.

* * * * *